(12) United States Patent
Nakano et al.

(10) Patent No.: US 8,875,863 B2
(45) Date of Patent: Nov. 4, 2014

(54) MULTI-DISC FRICTIONAL ENGAGEMENT MECHANISM

(75) Inventors: Yusuke Nakano, Yamato (JP); Katsuya Kobayashi, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 131 days.

(21) Appl. No.: 13/403,348

(22) Filed: Feb. 23, 2012

(65) Prior Publication Data

US 2012/0241280 A1    Sep. 27, 2012

(30) Foreign Application Priority Data

Mar. 22, 2011    (JP) ................. 2011-062120

(51) Int. Cl.
*F16D 13/40* (2006.01)
*F16D 25/06* (2006.01)
*F16D 25/0638* (2006.01)
*F16D 48/02* (2006.01)

(52) U.S. Cl.
CPC .... *F16D 25/0638* (2013.01); *F16D 2048/0212* (2013.01)
USPC ................. 192/85.24; 192/85.37; 192/89.2; 192/114 R

(58) Field of Classification Search
CPC combination set(s) only.
See application file for complete search history.

(56) References Cited

U.S. PATENT DOCUMENTS

| 3,354,994 | A | * | 11/1967 | Sieving et al. | 192/225 |
| 3,679,033 | A | * | 7/1972 | Wagner | 192/48.7 |
| 7,798,300 | B2 | | 9/2010 | Combes et al. | |
| 8,172,058 | B2 | * | 5/2012 | Grochowski et al. | 192/85.24 |
| 2004/0055850 | A1 | * | 3/2004 | Howard | 192/91 R |
| 2008/0264749 | A1 | | 10/2008 | Combes et al. | |
| 2008/0314711 | A1 | * | 12/2008 | Jayaram et al. | 192/87.1 |
| 2010/0179026 | A1 | | 7/2010 | Grochowski et al. | |

FOREIGN PATENT DOCUMENTS

| DE | 25 40 191 A1 | 3/1977 |
| DE | 31 18 565 A1 | 11/1982 |
| EP | 1 054 175 A2 | 11/2000 |
| FR | 2 871 109 A1 | 12/2005 |
| JP | 59-39326 U | 3/1984 |
| JP | 07-012221 A | 1/1995 |
| JP | 2010-242852 A | 10/2010 |

* cited by examiner

*Primary Examiner* — Gene Crawford
*Assistant Examiner* — Mark Manley
(74) *Attorney, Agent, or Firm* — Foley & Lardner LLP

(57) ABSTRACT

A multi-disc frictional engagement mechanism includes a plurality of driven plates and drive plates, a hydraulic piston, a spring which comes into contact with a pressure receiving portion of the hydraulic piston, an oil chamber which causes a hydraulic pressure to act on the pressure receiving portion, and a lock mechanism which restricts a movement of the hydraulic piston in a coupling direction toward the driven plates and the drive plates in a state where the hydraulic pressure is supplied to the oil chamber, the spring is compressed by the pressure receiving portion and the driven plates and the drive plates are not coupled.

5 Claims, 13 Drawing Sheets

MULTI-DISC FRICTIONAL ENGAGEMENT MECHANISM

FIELD OF THE INVENTION

The present invention relates to a multi-disc frictional engagement mechanism used in a clutch/brake of an automatic transmission.

BACKGROUND OF THE INVENTION

In a clutch/brake of an automatic transmission, a multi-disc frictional engagement mechanism is used to couple two members (both are rotational elements in the case of the clutch, one is a rotational element and the other is a non-rotational element in the case of the brake) which are coaxially arranged.

In the multi-disc frictional engagement mechanism, a plurality of friction plates are mounted slidably in an axial direction on the respective two members and the friction plates of the two members are alternately arranged. When the friction plates of the two members are pressed against each other by a hydraulic piston, the two members are coupled via the friction plates.

SUMMARY OF THE INVENTION

In the multi-disc frictional engagement mechanism having the above construction, it is necessary to drive an oil pump and constantly supply a hydraulic pressure to an oil chamber for displacing the hydraulic piston to maintain a coupled state, which has caused a problem of worsening fuel economy of a vehicle including an automatic transmission.

Further, in the case of constantly supplying the hydraulic pressure, a seal ring for producing a pressing force to a facing member by being deformed in axial and radial directions in response to the hydraulic pressure is constantly pressing the facing member, whereby fuel economy is worsened also by a sliding friction force of the seal ring.

JP7-12221A discloses an improvement in fuel economy of a vehicle by ensuring a clearance between friction plates utilizing a biasing force of a spring in an uncoupled state and, thereby, reducing friction between the friction plates in the uncoupled state. However, to maintain the coupled state, it remains to be necessary to constantly supply a hydraulic pressure to an oil chamber by driving an oil pump.

The present invention aims to improve fuel economy of a vehicle including an automatic transmission by reducing a hydraulic pressure supplied to an oil chamber for displacing a hydraulic piston in a coupled state and a released state.

According to an aspect of the present invention, a multi-disc frictional engagement mechanism for coupling a first member and a second member which are coaxially arranged is provided. The multi-disc frictional engagement mechanism includes a plurality of first friction plates mounted on the first member slidably in an axial direction; a plurality of second friction plates mounted on the second member slidably in the axial direction, the plurality of first friction plates and the plurality of second friction plates being alternately arranged; a hydraulic piston arranged displaceably in a direction perpendicular to the first and second friction plates and including a radially extending pressure receiving portion; a piston oil chamber which causes a hydraulic pressure to act on the pressure receiving portion; an elastic member which comes into contact with the pressure receiving portion from a side opposite to the piston oil chamber to bias the hydraulic piston toward the first and second friction plates; and a lock mechanism which restricts a movement of the hydraulic piston in a coupling direction toward the first and second friction plates in a state where the hydraulic pressure is supplied to the piston oil chamber, the elastic member is compressed by the pressure receiving portion and the first and second friction plates are not coupled.

According to the above aspect, the hydraulic pressure needs not be supplied to the oil chamber, which displaces the hydraulic piston, in the coupled state and released state. Thus, the hydraulic pressure supplied to the oil chamber can be reduced and, also, deformation of a seal ring can be suppressed to reduce a pressing force and reduce a sliding friction force by reducing the hydraulic pressure. Therefore, fuel economy of a vehicle including an automatic transmission can be improved.

Embodiments and advantages of this invention will be described in detail below with reference to the attached figures.

DESCRIPTION OF THE PREFERRED EMBODIMENTS

Figure 1:
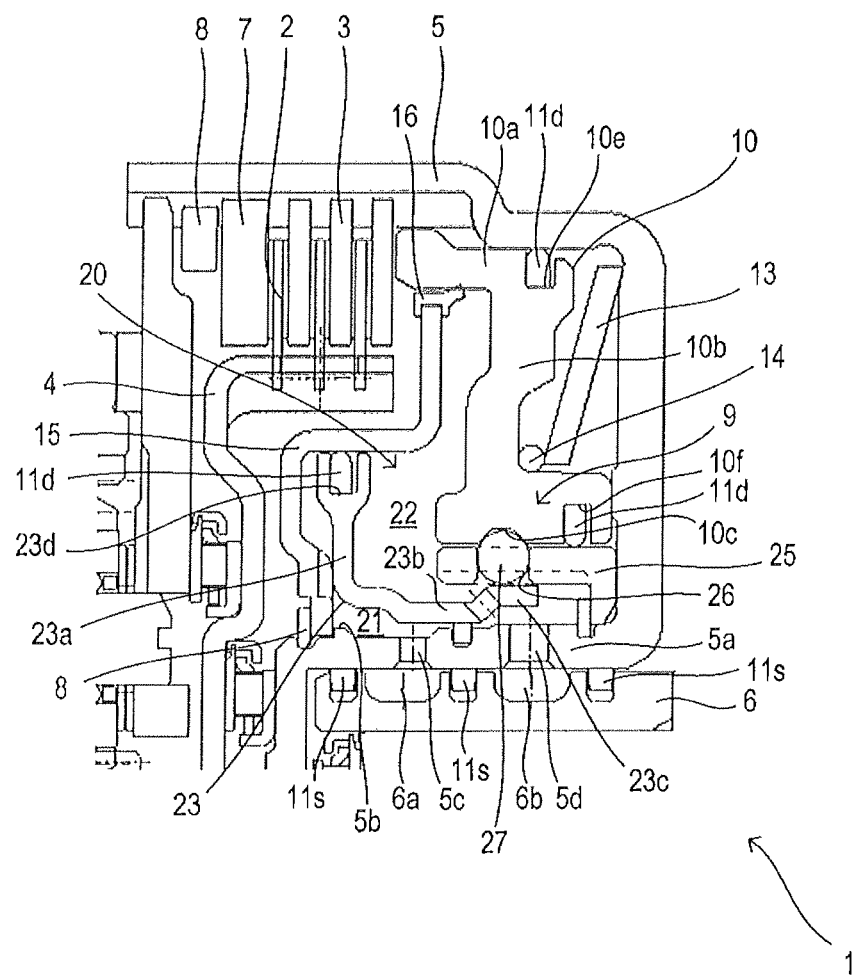
FIG. 1 is a sectional view of a multi-disc clutch according to a first embodiment of the present invention.

FIG. 1 is a sectional view of a multi-disc clutch 1 according to a first embodiment of the present invention. The multi-disc clutch 1 is a frictional engagement mechanism which is arranged in a transmission case of an automatic transmission and integrally rotatably couples a clutch hub 4 and a clutch drum 5, which are coaxially arranged, by coupling driven plates 2 and drive plates 3.

The clutch hub 4 is a tubular member with an open right side in FIG. 1 and coupled to an unillustrated rotational element (shaft, gear or the like).

The clutch drum 5 is a tubular member having an open left side in FIG. 1 and including a folded portion 5a inside. The clutch drum 5 is rotatably supported at the folded portion 5a via seal rings 11s provided on a drum support 6 fixed in the transmission. The clutch drum 5 is coupled to another unillustrated rotational element (shaft, gear or the like) and transmits rotation input from the other rotational element to the clutch hub 4 via the driven plates 2 and the drive plates 3.

Spline grooves extending in an axial direction are formed on the outer periphery of the clutch hub 4, and a plurality of driven plates 2 are fitted slidably in the axial direction in the spline grooves. Similarly, spline grooves extending in the axial direction are also formed on the inner periphery of the clutch drum 5, and a plurality of drive plates 3 are fitted slidably in the axial direction in the spline grooves.

The driven plates 2 are metal discs and friction materials are bonded to both surfaces thereof. The drive plates 3 are metal discs. The driven plates 2 and the drive plates 3 are alternately arranged, i.e. arranged in a nested manner.

A retaining plate 7 is further fitted in the spline grooves of the clutch drum 5. A displacement of the retaining plate 7 to the left of FIG. 1 is restricted by a snap ring 8.

A hydraulic piston 10 is housed in the clutch drum 5. The driven plates 2 and the drive plates 3 are coupled and released by displacing the hydraulic piston 10 in a direction perpendicular to the driven plates 2 and the drive plates 3. Note that, in the following description, a movement of the hydraulic piston 10 toward the driven plates 2 and the drive plates 3 is expressed by "to advance" and a movement thereof away from the driven plates 2 and the drive plates 3 is expressed by "to retract". Further, a direction toward the driven plates 2 and the drive plates 3 is expressed by a "coupling direction" and a direction away therefrom is expressed by a "releasing direction".

The hydraulic piston 10 includes a tubular piston portion 10a facing the driven plates 2 and the drive plates 3 and a pressure receiving portion 10b extending radially inward from the rear end of the piston portion 10a. The piston portion 10a can slide along the inner periphery of the clutch drum 5 in the coupling and releasing directions.

Further, an inner peripheral side of the pressure receiving portion 10b is tubular. Recessed portions 10e, 10f are respectively formed in the outer and inner peripheral end surfaces of the pressure receiving portion 10b, and D-rings 11d are respectively housed in the recessed portions 10e, 10f.

A high-load diaphragm spring 13 is arranged between the pressure receiving portion 10b and the clutch drum 5. The spring 13 comes into contact with the pressure receiving portion 10b from a side opposite to a second oil chamber 22 to be described later via a retainer 14, thereby biasing the hydraulic piston 10 in the coupling direction.

An opening side of the clutch drum 5 is sealed by an end plate 15 except at an outermost peripheral part where the piston portion 10a of the hydraulic piston 10 is arranged. The inner peripheral end of the end plate 15 is supported by the folded portion 5a of the clutch drum 5 and fixed to the clutch drum 5 by the snap ring 8 mounted on the folded portion 5a and a projecting portion 5b formed on the folded portion 5a. An oil seal 16 is mounted on the outer peripheral end of the end plate 15, and the outer peripheral end of the end plate 15 slides in contact with the inner periphery of the piston portion 10a via the oil seal 16.

An oil chamber 20 is defined by the end plate 15, the hydraulic piston 10 and the clutch drum 5. The oil chamber 20 is partitioned into a first oil chamber 21 and the second oil chamber 22 by a ball retaining piston 23 arranged displaceably in the axial direction in the oil chamber 20.

The ball retaining piston 23 includes a disc-shaped piston portion 23a and a tubular shaft portion 23b extending in the axial direction from the inner peripheral end of the piston portion 23a. An end part of the shaft portion 23b serves as a holding portion 23c raised radially outward (upward in FIG. 1). A recessed portion 23d is formed at the outer peripheral end of the piston portion 23a, and a D-ring 11d is mounted in the recessed portion 23d. The outer peripheral end of the piston portion 23a slides in contact with the end plate 15 via the D-ring 11d. Note that, in the following description, a movement of the ball retaining piston 23 to the right of FIG. 1 is expressed by "to advance" and a movement thereof to the left of FIG. 1 is expressed by "to retract".

A tubular sleeve 25 is interposed between the holding portion 23c and the end surface of the pressure receiving portion 10b of the hydraulic piston 10. The sleeve 25 is formed with a plurality of (eight to twelve) holes 26 in a circumferential direction, and lock balls 27 are respectively housed and held in the holes 26. Diameters of the plurality of holes 26 are respectively larger than the lock balls 27, which can freely move in the holes 26 unless coming into contact with the holding portion 23c of the ball retaining piston 23.

In this embodiment, the ball retaining piston 23, the sleeve 25, the lock balls 27 and a receiving portion 10c constitute a lock mechanism 9 for restricting a movement of the hydraulic piston 10 in the coupling direction.

The clutch drum 5 is formed with a first oil path 5c for supplying and discharging the hydraulic pressure to and from the first oil chamber 21 and a second oil path 5d for supplying and discharging the hydraulic pressure to and from the second oil chamber 22. An apply pressure can be supplied to the first oil chamber 21 from an oil path 6a formed in the drum support 6 via the first oil path 5c. Further, a release pressure can be supplied to the second oil chamber 22 from an oil path 6b formed in the drum support 6 via the second oil path 5d. Since the oil paths 5c, 5d, 6a and 6b are formed at a boundary part between the clutch drum 5 and the drum support 6 rotating relative to each other, the seal rings 11s are disposed at the opposite sides of the oil paths 5c, 5d, 6a and 6b lest the hydraulic pressure should leak from these oil paths 5c, 5d, 6a and 6b.

The seal rings 11s are deformed in the axial and radial directions in response to the hydraulic pressure from the oil paths 5c, 5d, 6a and 6b, thereby producing a force for pressing the drum support 6 to seal between the clutch drum 5 and the drum support 6.

A hydraulic pressure prepared by an unillustrated hydraulic control circuit using a hydraulic pressure discharged from an unillustrated oil pump as a source pressure is supplied to the first and second oil chambers 21, 22.

A state shown in FIG. 1 is a lock state where the multi-disc clutch 1 is released and the lock mechanism 9 is operating. That is, the hydraulic piston 10 is located at a most retracted position and the spring 13 is compressed. The lock balls 27 are engaged with the receiving portion 10c at the end surface of the pressure receiving portion 10b, and the holding portion 23c of the ball retaining piston 23 is in contact with the lock balls 27, thereby preventing the lock balls 27 from coming out of the receiving portion 10c. This makes it impossible for the hydraulic piston 10 to advance from the most retracted position.

In this state, the leading end of the hydraulic piston 10 is separated from the driven plates 2 and the drive plates 3, a biasing force of the spring 13 does not act on the driven plates 2 and the drive plates 3 and the multi-disc clutch 1 is in the released state. Further, even if the supply of the hydraulic pressure to the second oil chamber 22 is stopped, the multi-disc clutch 1 is maintained in the released state.

Next, the coupling and releasing operations of the above multi-disc clutch 1 are described.

FIGS. 2A to 2E show movements when the multi-disc clutch 1 changes from the released state to the coupled state.

Figure 2A:
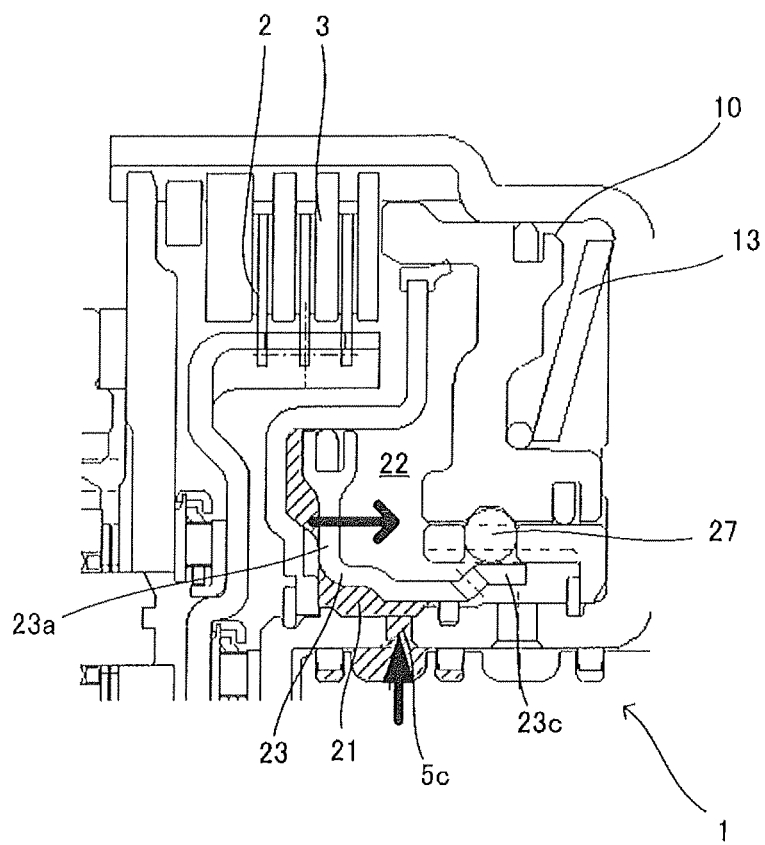
FIGS. 2A to 2E are views showing a coupling operation of the multi-disc clutch.
Figure 2B:
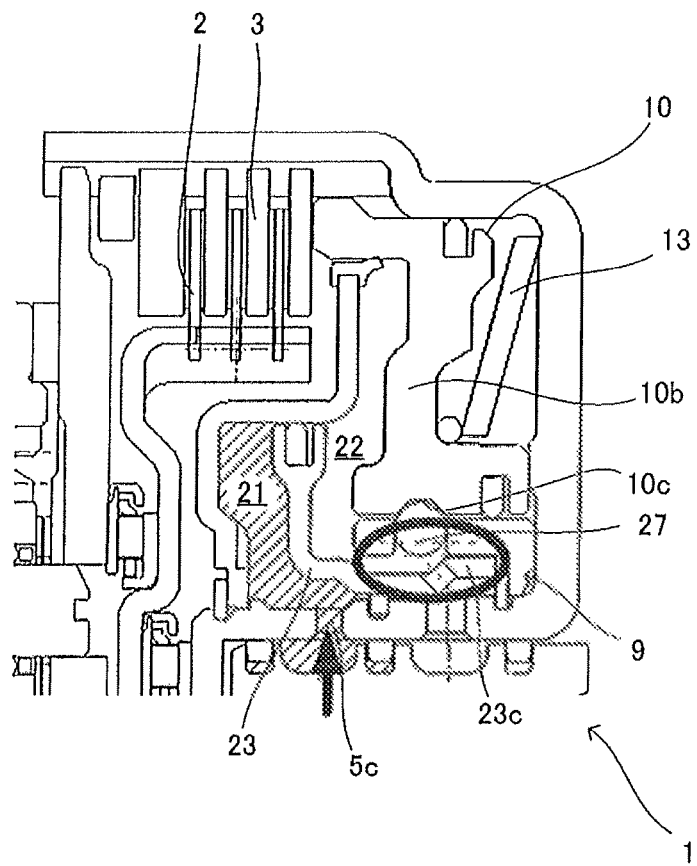

To couple the multi-disc clutch 1, the apply pressure is first supplied from the first oil path 5c to the first oil chamber 21 (FIG. 2A). By this, the hydraulic pressure of the first oil chamber 21 acts on the piston portion 23a of the ball retaining piston 23, the ball retaining piston 23 advances and the holding portion 23c of the ball retaining piston 23 is separated from the lock balls 27 (FIG. 2B).

Figure 2C:
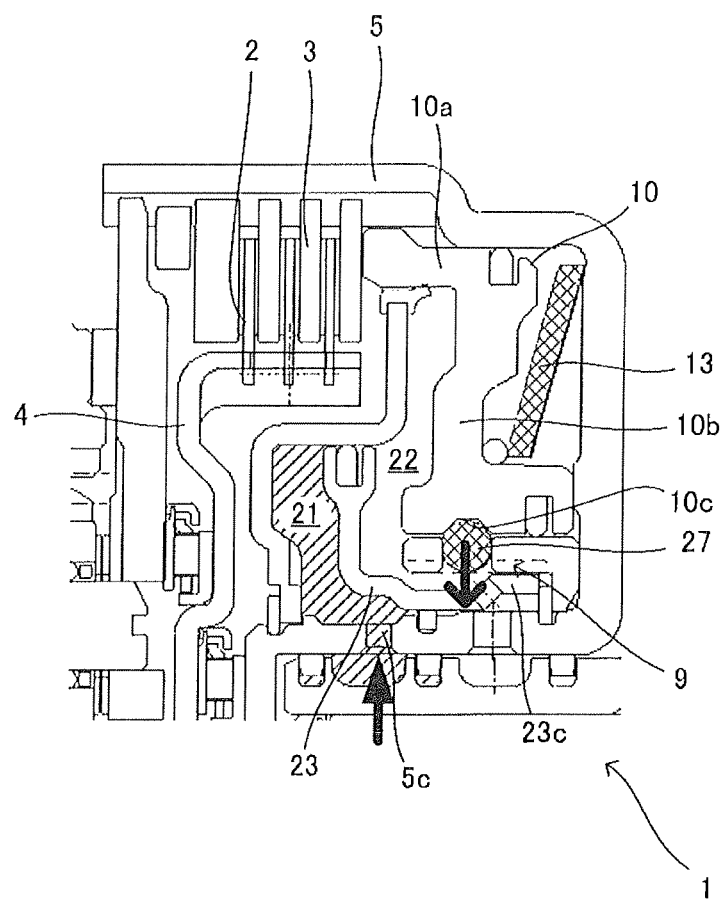

When the holding portion 23c is separated from the lock balls 27, the lock balls 27 are pushed out of the receiving portion 10c at the end surface of the pressure receiving portion 10b by the biasing force of the spring 13 transmitted via the pressure receiving portion 10b of the hydraulic piston 10, whereby the lock state by the lock mechanism 9 is removed (FIG. 2C).

Figure 2D:
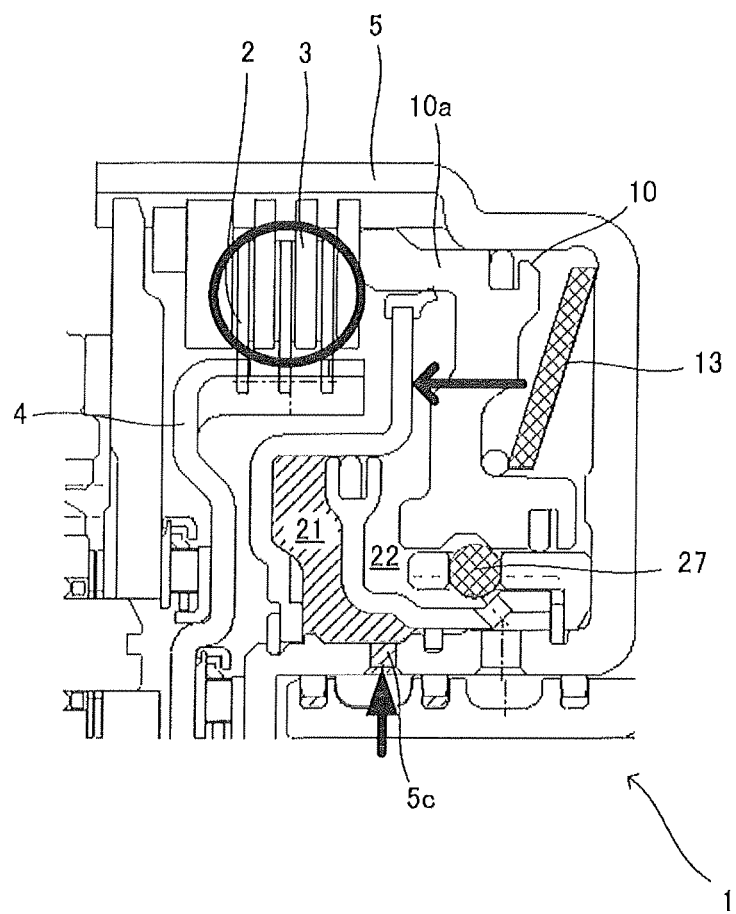

By this, the hydraulic piston 10 is caused to advance by the biasing force of the spring 13, the driven plates 2 and the drive plates 3 are pressed against each other by the piston portion 10a to be coupled, i.e. the multi-disc clutch 1 is coupled, and the clutch hub 4 and the clutch drum 5 are coupled (FIG. 2D).

Figure 2E:
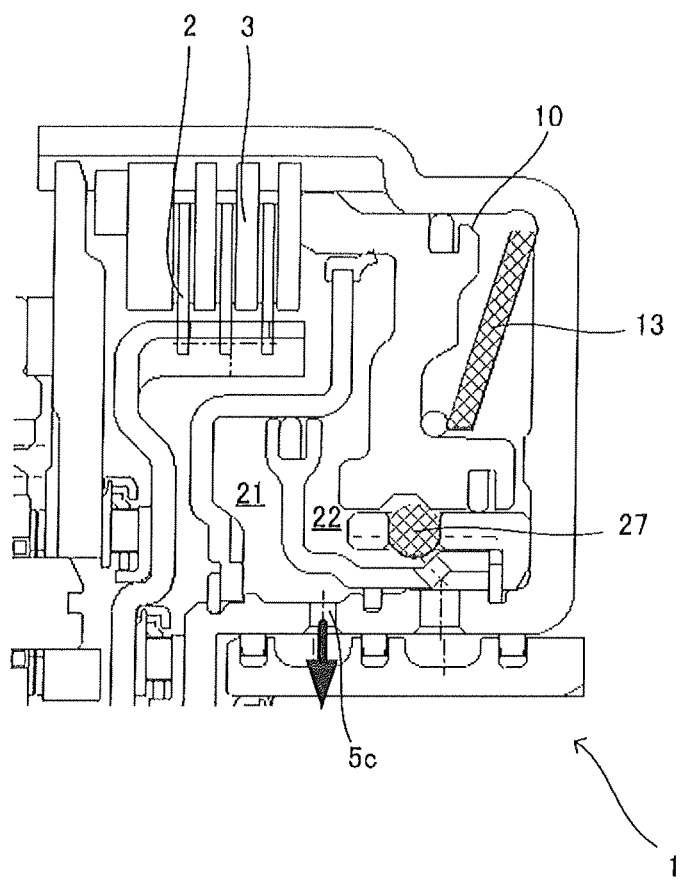

Thereafter, the supply of the apply pressure to the first oil chamber 21 is stopped. When the supply of the apply pressure to the first oil chamber 21 is stopped, the hydraulic pressure is discharged from the first oil path 5c and the hydraulic pressure of the first oil chamber 21 is reduced and finally becomes zero (FIG. 2E).

Even if the hydraulic pressure of the first oil chamber 21 becomes zero, the biasing force of the spring 13 continues to act on the driven plates 2 and the drive plates 3 and the multi-disc clutch 1 is maintained in the coupled state. The hydraulic pressure is supplied to the first oil chamber 21 only during the coupling operation and no hydraulic pressure needs to be supplied to maintain the coupled state.

FIGS. 3A to 3D show movements when the multi-disc clutch 1 changes from the coupled state to the released state.

Figure 3A:
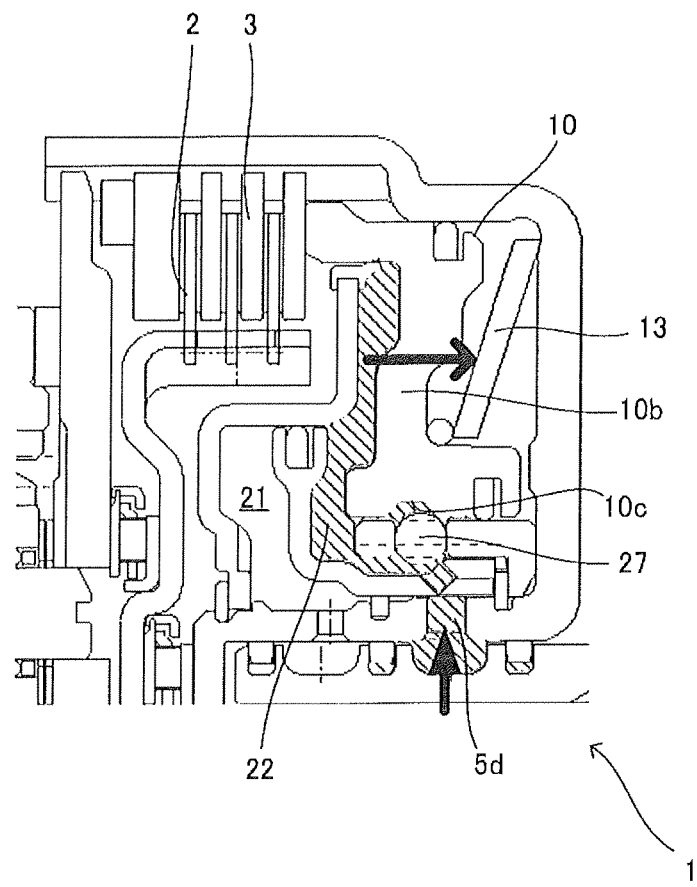
FIGS. 3A to 3D are views showing a releasing operation of the multi-disc clutch.

To release the multi-disc clutch 1, the release pressure is first supplied from the second oil path 5d to the second oil chamber 22 (FIG. 3A). By this, the hydraulic piston 10 is retracted and the spring 13 is compressed.

Figure 3B:
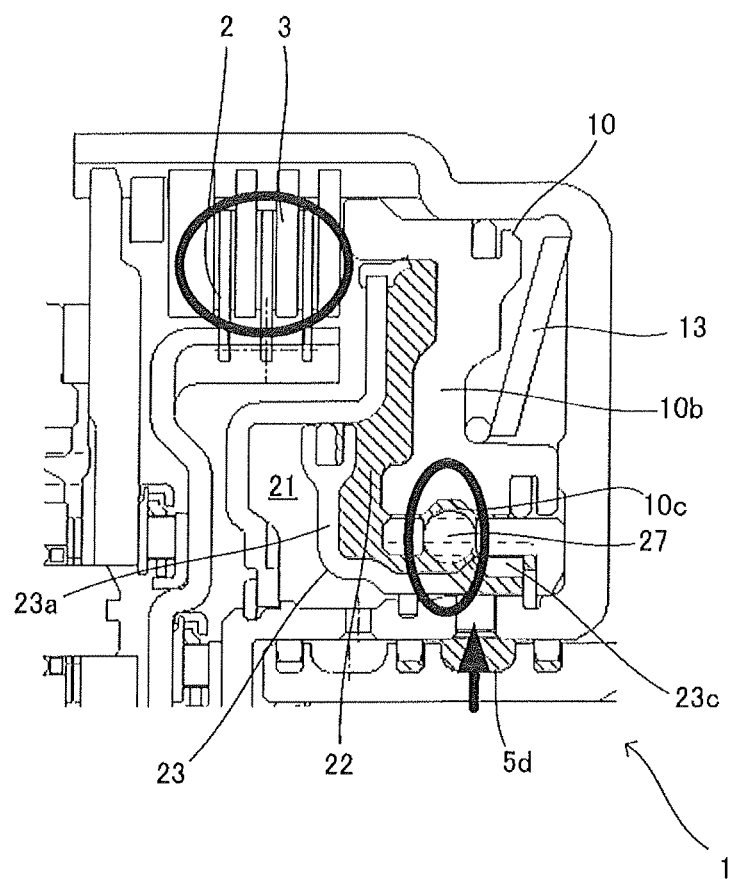

When the hydraulic piston 10 is retracted to the most retracted position, the axial-direction position of the receiving portion 10c at the end surface of the pressure receiving portion 10b and those of the lock balls 27 are aligned and a state is reached where the lock balls 27 are movable into the receiving portion 10c (FIG. 3B). Note that, in this state, the biasing force of the spring 13 does not act on the driven plates 2 and the drive plates 3 and the multi-disc clutch 1 is released.

Figure 3C:
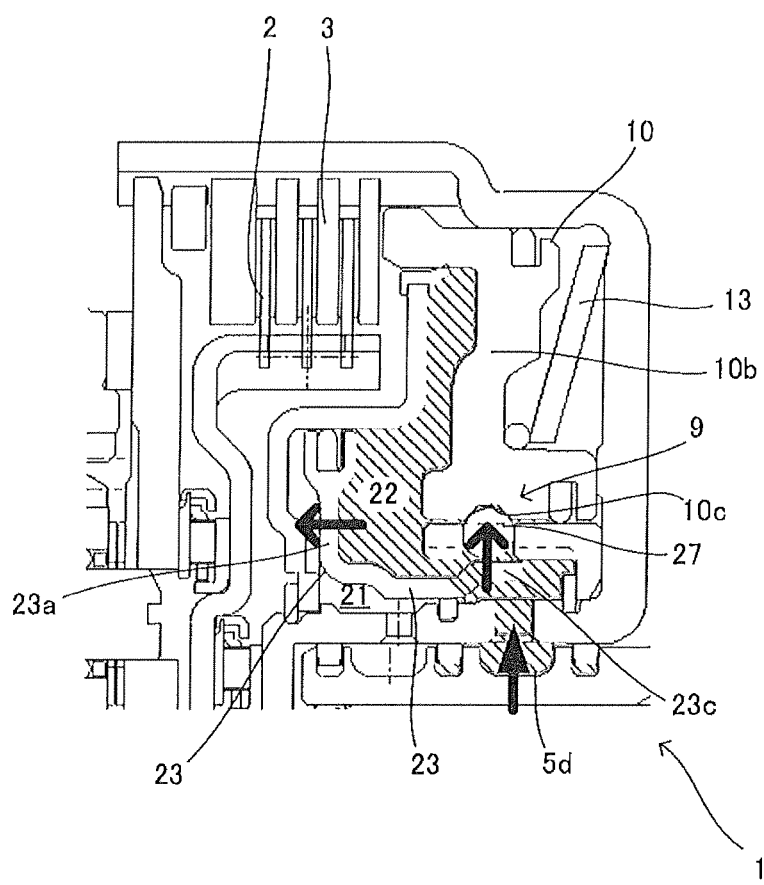

When the release pressure is further supplied to the second oil chamber 22, the hydraulic pressure of the second oil chamber 22 acts on the piston portion 23a of the ball retaining piston 23, the ball retaining piston 23 is retracted to the most retracted position and the holding portion 23c of the ball retaining piston 23 comes into contact with the lock balls 27. By this, the lock balls 27 enter the receiving portion 10c of the pressure receiving portion 10b and the lock mechanism 9 is locked (FIG. 3C).

Figure 3D:
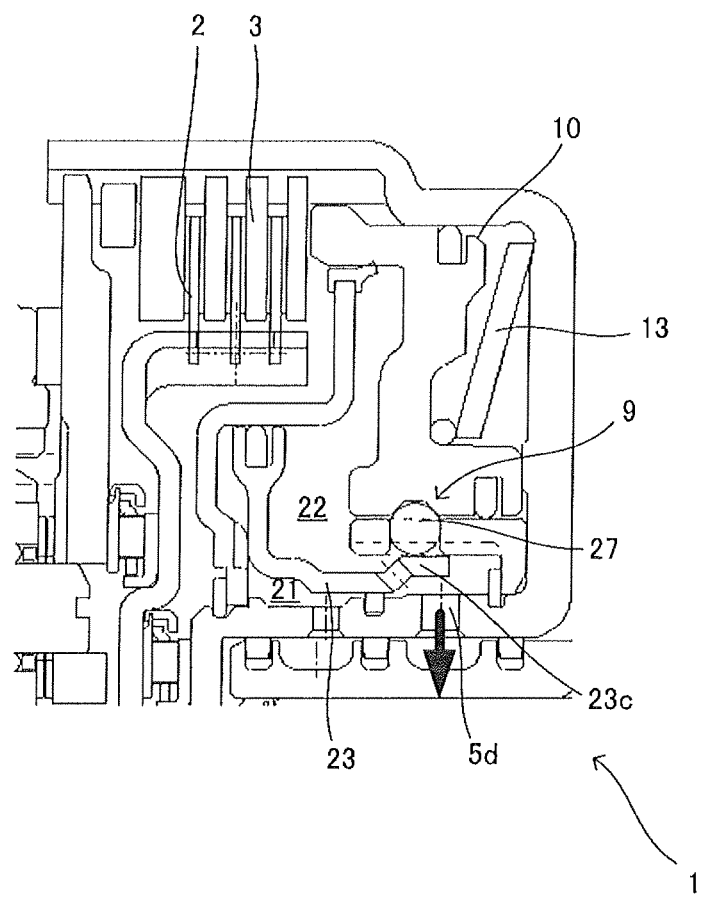

In the lock state, the supply of the release pressure to the second oil chamber 22 is stopped (FIG. 3D). Thereafter, the hydraulic pressure of the second oil chamber 22 is reduced by being discharged from the second oil path 5d and finally becomes zero. However, the movement of the hydraulic piston 10 in the coupling direction is kept restricted by the lock mechanism 9, the biasing force of the spring 13 does not act on the driven plates 2 and the drive plates 3, and the multi-disc clutch 1 is maintained in the released state.

The hydraulic pressure is supplied to the second oil chamber 22 only temporarily during the releasing operation. The multi-disc clutch 1 according to this embodiment requires no supply of the hydraulic pressure not only to maintain the coupled state, but also to maintain the released state.

Next, functions and effects of this embodiment are described.

According to this embodiment, the hydraulic pressure needs not be supplied to the oil chambers 21, 22 in the coupled state and the released state, and fuel economy of a vehicle including the automatic transmission can be improved by reducing the hydraulic pressure supplied to the oil chambers 21, 22.

Further, when the hydraulic pressure supplied to the oil chambers 21, 22 is reduced, the deformation of the seal rings 11s is suppressed to reduce the pressing force and reduce a sliding friction force between the seal ring 11s and the drum support 6. Thus, fuel economy can also be improved by this.

Further, since the lock mechanism 9 is a ball lock mechanism using the lock balls 27, sticking of the hydraulic piston 10 caused by an engaging member used for locking being got stuck with peripheral members can be prevented.

Next, a second embodiment of the present invention is described.

Figure 4:
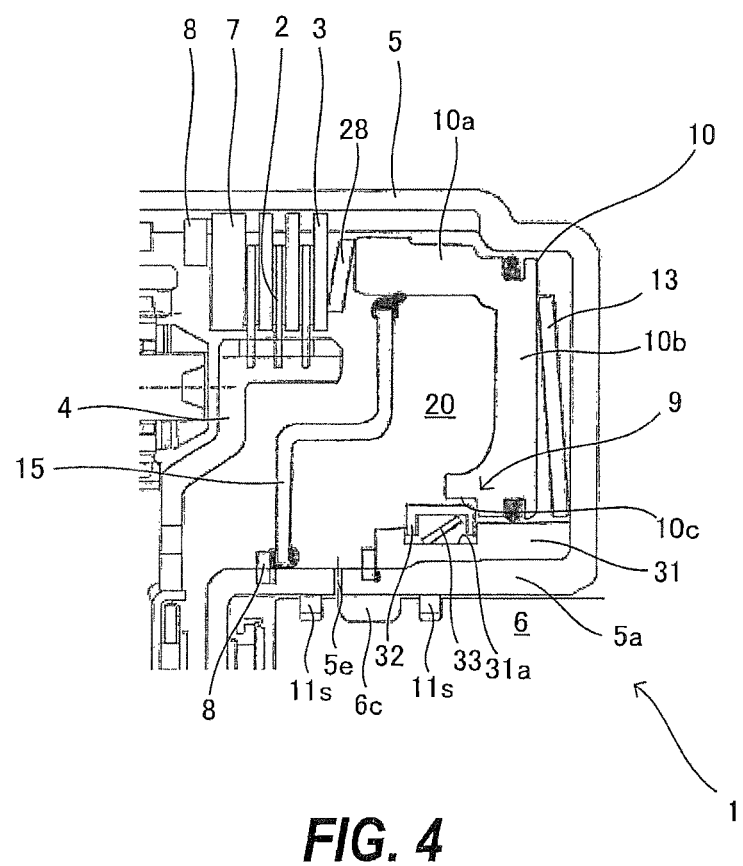
FIG. 4 is a sectional view of a multi-disc clutch according to a second embodiment of the present invention.

FIG. 4 is a sectional view of a multi-disc clutch 1 according to the second embodiment of the present invention.

The second embodiment is the same as the first embodiment in that a clutch hub 4 and a clutch drum 5 are integrally rotatably coupled via driven plates 2 and drive plates 3, a spring 13 for biasing a hydraulic piston 10 in an axial direction is provided and an oil chamber 20 is defined by the hydraulic piston 10, the clutch drum 5 and an end plate 15. Constructions common to the first embodiment are denoted by the same reference numerals. The following description is centered on points of difference.

A tension plate 28 is interposed between the hydraulic piston 10 and the driven plates 2, the drive plates 3.

A lock mechanism 9 is arranged at an inner peripheral side of the clutch drum 5. Unlike the lock mechanism 9 of the first embodiment, the lock mechanism 9 includes a tubular base member 31 to be fitted on a folded portion 5a and a lock piston 32 and a lock spring 33 housed in a recessed portion 31a formed on the outer periphery of the base member 31. The lock spring 33 biases the lock piston 32 toward the oil chamber 20.

A receiving portion 10c of the hydraulic piston 10 is shaped to correspond to the lock piston 32 and formed such that about a half of the upper surface of the lock piston 32 is exposed to the oil chamber 20 with the lock piston 32 fitted.

An oil path 5e is formed in the folded portion 5a of the clutch drum 5, so that the supply and discharge of a hydraulic pressure to and from the oil chamber 20 can be made through an oil path 6c formed in a drum support 6 via the oil path 5e. A diameter of the oil path 5e is sufficiently smaller than that of the oil path 6c and the oil path 5e functions as a throttle in the case of supplying and discharging the hydraulic pressure to and from the oil chamber 20.

A state shown in FIG. 4 is a released state of the multi-disc clutch 1 and a lock state where a movement of the hydraulic piston 10 in a coupling direction is restricted by the lock mechanism 9.

That is, the leading end of the hydraulic piston 10 is separated from the driven plates 2 and the drive plates 3, a biasing force of the spring 13 does not act on the driven plates 2 and the drive plates 3 and the multi-disc clutch 1 is in the released state. The hydraulic piston 10 is located at a most retracted position, the spring 13 is compressed, the lock piston 32 is engaged with the receiving portion 10c at an end part of a pressure receiving portion 10b, and the hydraulic piston 10 cannot advance from the most retracted position. In this state, even if the supply of the hydraulic pressure to the oil chamber 20 is stopped, the multi-disc clutch 1 is maintained in the released state.

Next, the coupling and releasing operations of the above multi-disc clutch 1 are described.

Figure 5:
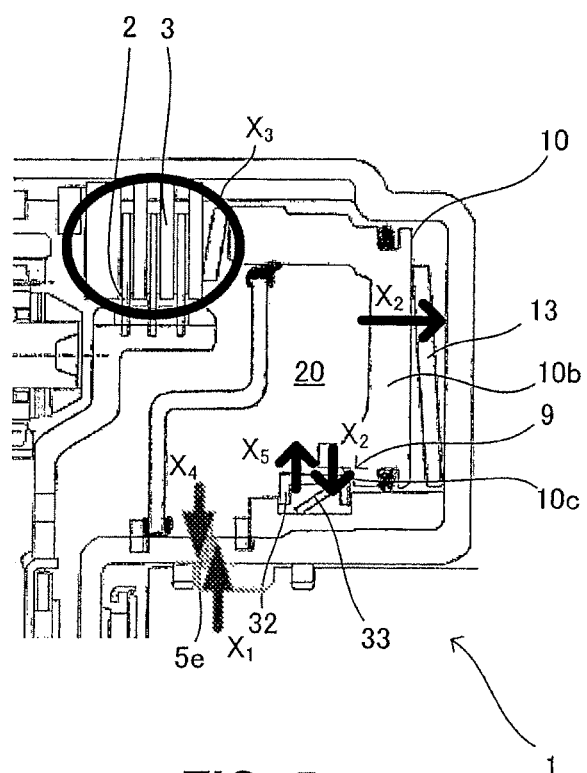
FIG. 5 is a view showing a releasing operation of the multi-disc clutch.

FIG. 5 shows movements when the multi-disc clutch 1 changes from the coupled state to the released state.

To release the multi-disc clutch 1, a high hydraulic pressure capable of retracting the hydraulic piston 10 is first supplied to the oil chamber 20 from the oil path 5e ($X_1$ in FIG. 5). By this, the hydraulic piston 10 is retracted, the spring 13 is compressed and the lock piston 32 is retracted against a biasing force of the lock spring 33 ($X_2$ in FIG. 5).

When the hydraulic piston 10 is retracted to the most retracted position, the biasing force of the spring 13 no longer acts on the driven plates 2 and the drive plates 3, whereby the multi-disc clutch 1 is released ($X_3$ in FIG. 5).

When the multi-disc clutch 1 is released, the supply of the hydraulic pressure to the oil chamber 20 is stopped ($X_4$ in FIG. 5). Although the hydraulic pressure in the oil chamber 20 is discharged via the oil path 5e, the hydraulic pressure of the oil chamber 20 does not suddenly decrease since the oil path 5e functions as a throttle.

As a result, the lock piston 32 having a smaller volume change amount per stroke than the hydraulic piston 10 returns (projects) earlier than the hydraulic piston 10 is pushed back by the spring 13 and is engaged with the receiving portion 10c of the pressure receiving portion 10b ($X_5$ in FIG. 5).

By this, the lock mechanism 9 reaches the lock state, the movement of the hydraulic piston 10 in the coupling direction is restricted, and the released state of the multi-disc clutch 1 is maintained even if the hydraulic pressure of the oil chamber 20 becomes zero. The hydraulic pressure is supplied to the oil chamber 20 only temporarily during the releasing operation.

Figure 6:
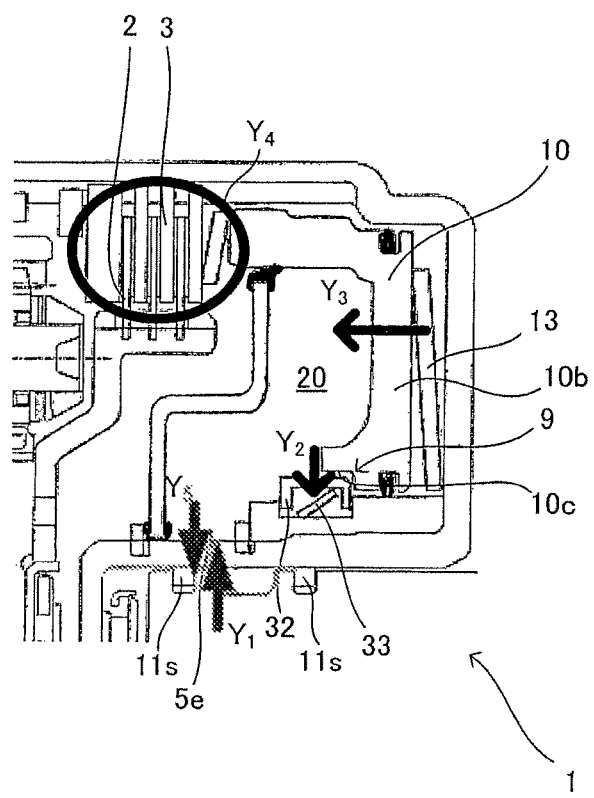
FIG. 6 is a view showing a coupling operation of the multi-disc clutch.

FIG. 6 shows movements when the multi-disc clutch 1 changes from the released state to the coupled state.

To couple the multi-disc clutch 1, a hydraulic pressure of such a magnitude as to retract the lock piston 32 against the biasing force of the lock spring 33 is first supplied to the oil chamber 20 from the oil path 5e ($Y_1$ in FIG. 6). By this, the lock piston 32 comes out of the receiving portion 10c of the pressure receiving portion 10b and the hydraulic piston 10 is made movable in the coupling direction ($Y_2$ in FIG. 6).

When the hydraulic piston 10 becomes movable in the coupling direction, the hydraulic piston 10 advances due to the biasing force of the spring 13 ($Y_3$ in FIG. 6) and the driven plates 2 and the drive plates 3 are pressed to couple the multi-disc clutch 1 ($Y_4$ in FIG. 6).

When the multi-disc clutch 1 is coupled, the supply of the hydraulic pressure to the oil chamber 20 is stopped ($Y_5$ in FIG. 6). Thereafter, the hydraulic pressure in the oil chamber 20 is reduced by being discharged via the oil path 5e. However, even if the supply of the hydraulic pressure to the oil chamber 20 becomes zero, the biasing force of the spring 13 acts on the driven plates 2 and the drive plates 3 and the coupled state of the multi-disc clutch 1 is maintained. The hydraulic pressure is supplied to the oil chamber 20 only temporarily during the coupling operation.

Also by the second embodiment, the hydraulic pressure needs not be supplied to the oil chamber 20 in the coupled state and the released state and the hydraulic pressure supplied to the oil chamber 20 can be reduced as in the first embodiment. Further, when the hydraulic pressure supplied to the oil chamber 20 decreases, a pressing force of seal rings 11s decreases to reduce a slide friction force between the seal rings 11s and the drum support 6. Therefore, fuel economy of a vehicle including an automatic transmission can be improved.

Although the embodiments of the present invention have been described above, the above embodiments are only illustration of some application examples of the present invention and not of the nature to limit the technical scope of the present invention to the specific constructions of the above embodiments.

For example, the present invention is applied to the multi-disc clutch 1 in the above embodiments, but may also be applied to a brake in which one of elements to be coupled is a rotational element and the other element is a non-rotational element.

Although the supply of the hydraulic pressure is stopped to zero the hydraulic pressure in the coupled and released states in the above embodiments, the hydraulic pressure may only be reduced (hydraulic pressure after a reduction is equal to or more than zero).

This application claims priority based on Japanese Patent Application No. 2011-62120, filed with the Japan Patent Office on Mar. 22, 2011, the entire content of which is incorporated into this specification by reference.

What is claimed is:

1. A multi-disc frictional engagement mechanism for coupling a first member and a second member which are coaxially arranged, comprising:
    a plurality of first friction plates mounted on the first member slidably in an axial direction;
    a plurality of second friction plates mounted on the second member slidably in the axial direction, the plurality of first friction plates and the plurality of second friction plates being alternately arranged;
    a hydraulic piston arranged displaceably in a direction perpendicular to the pluralities of the first and second friction plates and including a radially extending pressure receiving portion;
    a piston oil chamber configured to cause a hydraulic pressure to act on the pressure receiving portion;
    an elastic member configured to come into contact with the pressure receiving portion from a side opposite to the piston oil chamber so as to bias the hydraulic piston toward the pluralities of the first and second friction plates; and
    a lock mechanism comprising a holding member and an engaging member, the lock mechanism being configured to restrict a movement of the hydraulic piston in a coupling direction toward the pluralities of the first and second friction plates in a state in which the hydraulic pressure is supplied to the piston oil chamber, the elastic member is compressed by the pressure receiving portion, and the pluralities of the first and second friction plates are not coupled,
    wherein the lock mechanism is locked when the hydraulic pressure of the piston oil chamber acts on the lock mechanism, and
    wherein the hydraulic piston is configured such that the restriction of the movement in the coupling direction by the lock mechanism is removed in a state in which the hydraulic pressure acts on a piston portion from the side opposite to the piston oil chamber and the holding member is separated from the engaging member.

2. The multi-disc frictional engagement mechanism according to claim 1, wherein:
    the engaging member is movable toward the pressure receiving portion;
    the holding member is configured to come into contact with the engaging member moved toward the pressure receiving portion to hold the engaging member;
    the pressure receiving portion includes a receiving portion with which the engaging member is configured to be engaged, at an end part of the pressure receiving portion; and
    the engaging member is moved by the hydraulic pressure supplied to the piston oil chamber so as to be engaged with the receiving portion and to come into contact with the holding member such that the movement of the hydraulic piston in the coupling direction is restricted.

3. The multi-disc frictional engagement mechanism according to claim 2, wherein:

the holding member includes the piston portion, which is configured to receive the hydraulic pressure of the piston oil chamber, and is configured to move to a position where the holding member is held in contact with the engaging member by the hydraulic pressure supplied to the piston oil chamber.

4. The multi-disc frictional engagement mechanism according to claim 2, further comprising:
a tubular member interposed between the pressure receiving portion and the holding member and including a plurality of radially extending holes,
wherein the engaging member is a plurality of balls held in the plurality of holes.

5. A multi-disc frictional engagement mechanism for coupling a first member and a second member which are coaxially arranged, comprising:
a plurality of first friction plates mounted on the first member slidably in an axial direction;
a plurality of second friction plates mounted on the second member slidably in the axial direction, the plurality of first friction plates and the plurality of second friction plates being alternately arranged;
a hydraulic piston arranged displaceably in a direction perpendicular to the pluralities of the first and second friction plates and including a radially extending pressure receiving portion;
a piston oil chamber configured to cause a hydraulic pressure to act on the pressure receiving portion;
an elastic member configured to come into contact with the pressure receiving portion from a side opposite to the piston oil chamber so as to bias the hydraulic piston toward the pluralities of the first and second friction plates; and
a lock mechanism configured to restrict a movement of the hydraulic piston in a coupling direction toward the pluralities of the first and second friction plates in a state in which the hydraulic pressure is supplied to the piston oil chamber, the elastic member is compressed by the pressure receiving portion, and the pluralities of the first and second friction plates are not coupled, wherein:
the lock mechanism is locked when the hydraulic pressure of the piston oil chamber acts on the lock mechanism,
the lock mechanism includes an engaging member and a second elastic member configured to bias the engaging member toward the pressure receiving portion;
the pressure receiving portion includes a receiving portion with which the engaging member is configured to be engaged at an end part of the pressure receiving portion;
the engaging member is configured so as to move and engage with the receiving portion by a biasing force of the second elastic member prior to the hydraulic piston being pushed back by the elastic member such that the movement of the hydraulic piston in the coupling direction is restricted when the hydraulic pressure supplied to the piston oil chamber is reduced from a state in which the hydraulic pressure is supplied to the piston oil chamber and the elastic member is compressed by the pressure receiving portion;
the engaging member is partially exposed to the piston oil chamber; and
the restriction of the movement of the hydraulic piston in the coupling direction by the lock mechanism is removed by temporarily supplying the hydraulic pressure to the piston oil chamber and retracting the engaging member against the biasing force of the second elastic member.

* * * * *